United States Patent [19]

Scott, Jr. et al.

[11] Patent Number: 5,378,955
[45] Date of Patent: Jan. 3, 1995

[54] METHOD FOR FABRICATION OF A MICROCHANNEL ELECTRON MULTIPLIER

[75] Inventors: Russell F. Scott, Jr., Palo Alto, Calif.; John E. Tiffany, Jr., Salt Lake City, Utah

[73] Assignee: Intevac, Inc., Santa Clara, Calif.

[21] Appl. No.: 707,791

[22] Filed: Jul. 19, 1976

Related U.S. Application Data

[63] Continuation of Ser. No. 436,265, Jan. 16, 1974, abandoned, which is a continuation of Ser. No. 197,557, Nov. 8, 1971, abandoned.

[51] Int. Cl.$^6$ .............................................. H01J 43/00
[52] U.S. Cl. .............................. 313/105 CM; 65/155
[58] Field of Search ............... 315/10; 65/4 A, 31, 65/110, 111, 155, 4.1; 313/105 CM

[56] References Cited

U.S. PATENT DOCUMENTS 3,395,006 7/1968 Hopkins et al. .................. 65/155
3,678,328 7/1972 Cross et al. ...................... 313/105

*Primary Examiner*—Theodore M. Blum
*Attorney, Agent, or Firm*—Stanley Z. Cole

[57] ABSTRACT

A bundle of multiglass fibers are assembled within an outer glass tube. An intermediate glass structure is interposed between the bundle of multifibers and the outer glass tube. The intermediate glass structure has a softening temperature within the range of minus 5% and plus 15% of the softening temperature of the multifibers and less than the softening temperature of the outer glass tube. The assembly is heated and the outer glass tube is pressurized from the outside to produce a uniform compressive force for fusing the multifibers and the intermediate glass structure around the multifibers. The intermediate glass structure may include a glass tube, multiple layers of glass fibers or an inner layer of glass fibers surrounded by a glass tube.

16 Claims, 1 Drawing Sheet

METHOD FOR FABRICATION OF A MICROCHANNEL ELECTRON MULTIPLIER

This application is a continuation of Ser. No. 05/436,265 filed Jan. 16, 1974 now abandoned, which is a continuation of Ser. No. 05/197,557 filed Nov. 8, 1971 now abandoned.

DESCRIPTION OF THE PRIOR ART

Heretofore, microchannel electron multiplier plates have been fabricated by assembling a bundle of multifibers, each of said multifibers consisting of a multitude of lesser glass fibers, each lesser glass fiber having an etchable core portion clad with an outer more stable glass portion. The bundle of multifibers was assembled within an outer glass tube having a softening temperature substantially above that of the cladding glass of the individual glass fibers. The outer tube was sealed in gas communication with a high vacuum pump and inserted within a furnace for heating the assembly to a fusing temperature. The fusing temperature was generally slightly below the softening temperature of the cladding glass and well below the softening temperature of the outer glass envelope. After the assembly had reached a fusing temperature and after several hours of outgassing the outside of the outer tube was pressurized from the outside to approximately 10 atmospheres of nitrogen to produce a uniform compressive force on the assembly, thereby pressing the outer tube into intimate contact with the multifiber bundle. This uniform pressure produced uniform fusing of the multifibers.

After the multifibers were fused, the assembly was sliced transversely into thin plates which were then etched to remove the core portions of the multifibers, thereby producing a channelized microchannel electron multiplier body. The channels within the plate typically had a diameter of approximately 17 microns with 2 micron wall thickness between adjacent channels. The channels had a length to diameter ratio of between 30 and 40. The outer glass tube, as fused to the multifibers, served as a retaining ring to facilitate handling of the individual plates after the slicing operation.

One of the problems with the prior art method for fabrication of such microchannel plates was that the outer glass tube had to have a relatively high softening point compared to that of the multifibers in order to have sufficient strength to support the bundle of fibers without twisting or deformation during the bake out and fusing phases of fabrication. As a consequence, the outer glass tube was not sufficiently softened when pressed in intimate contact with the bundle of multifibers. In some instances the multifibers were distorted near the outer periphery of the resultant plate and in many cases voids and non-uniform contact was obtained between the outer sleeves and the multifibers. After the plates have been etched and processed, an electrode is deposited over the ends of the arrays of channels. If voids or non-uniform joints are obtained between the outer retaining ring and the multifibers, imperfect electrical contact is obtained across such junctions, thereby deleteriously affecting performance of the microchannel plates in use. Moreover, due to the voids between the retaining glass ring and the multifibers, contaminants become lodged in such openings which can outgas, in use, deleteriously affecting the photocathode and shortening the operating life of an image tube employing such a microchannel electron multiplier.

SUMMARY OF THE PRESENT INVENTION

The principal object of the present invention is the provision of an improved method for fabrication of a microchannel electron multiplier.

In one feature of the present invention, a bundle of multiglass fibers to be fused is inserted within an outer glass tube with a glass structure interposed surrounding the bundle of multifibers between the multifibers and the outer glass tube, such intermediate glass structure having a softening point within +15% and −5% of the softening temperature of the cladding glass of the multifibers and having a softening temperature preferably below the softening temperature of the outer glass tube, whereby, upon fusing of the assembly under pressure, uniform joints are obtained between the intermediate glass structure and the multifiber bundle without distortion of the multifibers.

In another feature of the present invention, the intermediate glass structure includes a layer of glass fibers disposed abutting the bundle of multifibers.

In another feature of the present invention, the intermediate glass structure includes a glass sleeve surrounding the bundle of multifibers.

In another feature of the present invention, the intermediate glass structure includes several layers of glass fibers.

In another feature of the present invention, the intermediate glass structure includes several layers of glass fibers such glass fibers comprising a mixture of fibers having two different softening points.

Other features and advantages of the present invention will become apparent upon a perusal of the following specification taken in connection with the accompanying drawings wherein:

DESCRIPTION OF THE PREFERRED EMBODIMENTS

Figure 1:
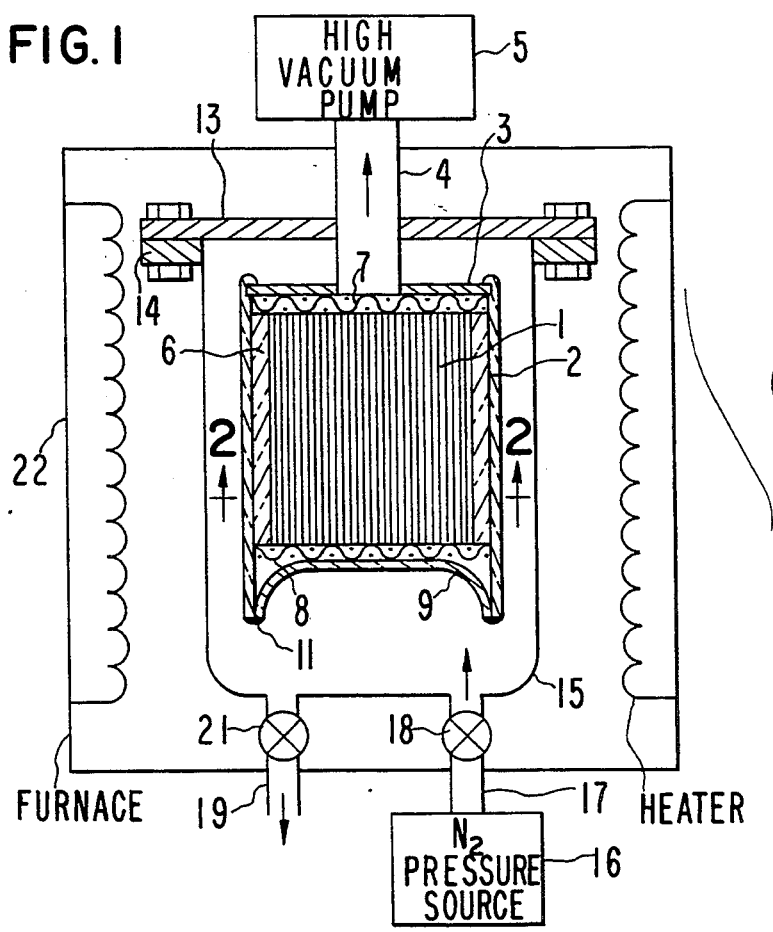
FIG. 1 is a schematic longitudinal sectional line diagram, partly in block diagram form, depicting an apparatus for fusing glass fibers according to the present invention.
Figure 2:
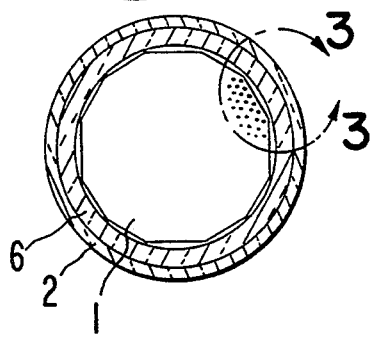
FIG. 2 is a reduced sectional view of the structure of FIG. 1 taken along the line 2—2 in the direction of the arrows.

Referring now to FIG. 1, there is shown an apparatus for fusing bundles of multifibers according to the present invention. The structure of FIG. 1 includes a bundle of multifibers 1, as of 6 to 8 inches in length and of a 12 sided polygon cross section, with transverse dimensions between opposed corners of the polygon of approximately 1.00 inches. Each of the multifibers within the bundle 1 consists of a composite fiber of hexagonal cross section, as of 0.034 inches in diameter, and comprising a multitude of lesser fibers, as of 20 microns in diameter. Each of the lesser fibers includes a cylindrical etchable core portion, as of 14 microns in diameter surrounded by an electrically conductive cladding glass sheath, as of lead glass. The multifibers have been drawn and fused such that the core portions retain their cylindrical geometry, whereas the cladding glass sheath portions have been fused together, whereby the core portions are disposed in a close packing geometry with the cladding glass portions forming a glass web inbetween and around the array of cores. In a typical example, the core portions are made of an etchable glass such as Schott type LaK-3 glass (thoria glass) having a softening temperature of approximately 693° C., whereas the cladding glass is a lead glass type 8161 having a softening temperature of approximately 600° C.

The bundle 1 of multifibers is inserted within an outer tubular glass sleeve 2 having an inside diameter, as of 1.5 inches and a wall thickness as of 0.060–0.080 inches and having a softening point of 630° C. A suitable outer glass sleeve 2 consists of lead glass type G-12 commercially available from Corning Glass Company. Other sleeve 2 is sealed by a gas tight metal-to-glass seal to a centrally apertured metallic disc 3, which in-turn is sealed, as by welding, to an exhaust tubulation 4 connected in gas communication with a high vacuum pump 5, such as a getter ion vacuum pump. The bundle of mutifibers 1 is retained by means of loops of retaining wire, as of molybdenum, circling the bundle at opposite ends thereof, not shown. The outer glass sleeve 2 preferably has a softening temperature above that of the cladding glass, as of 30° C. to 100° C. higher.

An intermediate glass structure 6, such as a glass tube having an inside diameter of 1.030 inches, a wall thickness of 0.190 inches, and made of Corning glass 8161 having a softening point of 600° C., is interposed around the bundle and between the bundle 1 and the outer tube 2. A pair of stainless steel retaining screens 7 and 8 are disposed at opposite ends of the bundle 1. An inwardly directed cup-shaped end wall 9, as of glass is sealed across the open end of the outer tube 2 by means of a glass seal 11 at the lip of the cup 9.

A centrally apertured flange plate 13 is sealed to the exhaust tubulation 4 and is bolted to a mating flange 14 at the lip of a cup-shaped pressure chamber 15, as of stainless steel. A high pressure source of gas 16, as of nitrogen, is connected to the pressure chamber 15 via a fill tubulation 17 and a control valve 18. The pressure chamber 15 is vented to the atmosphere via the intermediary of a vent tubulation 19 and control valve 21. A clam shell furnace 22 surrounds the pressure chamber 15.

In operation, the 12 sided bundle of multifibers 1 is inserted within the outer glass tube 2 with the intermediate glass structure 6 interposed therebetween. The glass tube 2 is sealed via end cup 9 and inserted within the pressure chamber 15. The pressure chamber is inserted within the furnace 22. With the pressure chamber 15 vented to atmosphere the temperature of the glass assembly is raised at a rate of 3° C. per minute to a processing temperature of 600° C. The glass assembly is held at 600° C. for 30 minutes. As the assembly is heated it is being continuously pumped by high vacuum pump 5 to assure thorough outgassing of all of the glass members within the assembly.

After the temperature has been held for 30 minutes at 600° C., the pressure chamber 15 is closed to the atmosphere by closing valve 21. Then valve 18 is opened to valve high pressure nitrogen gas into the chamber 15 for exerting a compressive force on the outer tube 2. The pressure is gradually increased within chamber 15 to approximately 14 atmospheres while maintaining the temperature at 600° C. and while maintaining the vacuum on the assembly. As the pressure is increased on the outer tube 2, the tube deforms and collapses onto the intermediate glass structure 6, which in-turn transmits a uniform compressive force upon the bundle of multifibers 1.

As a result the glass mutifibers 1 are fused to the intermediate glass structure 6 to form an intimate bond therebetween. The compressive force is also transmitted uniformly throughout the bundle of fibers fusing all of the multifibers together uniformly without distortion thereof. After fusing of the glass fibers 1 and intermediate glass structure 6, the high pressure source 16 is valved off by closing valve 18, and the chamber 15 is vented to the atmosphere for removing the pressure. The glass assembly is allowed to cool to room temperature.

The resultant fused glass assembly, boule, is then ground to remove tube 2 and sliced transversely to form plates, as of 0.02 inches in thickness, which are then subsequently etched to remove the etchable core glass portions of the multifibers to form a channelized plate. The channelized plate is then treated with a reducing atmosphere such as hydrogen gas to render the inside walls of the channelized bores semiconductive. Electrodes are deposited over opposite ends of the plate to form a microchannel electron multiplier plate.

Figure 3:
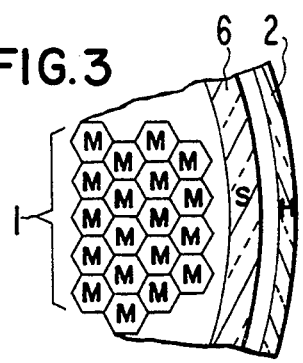
FIGS. 3-7 are enlarged detail views of alternative embodiments of that portion of the structure of FIG. 2 delineated by lines 3—3.
Figure 8:
FIG. 8 is a fragmentary sectional view of a portion of the structure similar to that of FIGS. 3-7 depicting the final fused assembly.

Referring now to FIG. 3, the multifibers M and outer tube 2 with the intermediate glass structure 6 is shown in greater detail. Intermediate glass structure 6, such as a tubular member of glass having a softening point within −5 and +15% of the softening point of the cladding glass used in the multifibers M, serves to take up the shock on the multifibers M as the outer tube 2 compresses the intermediate tube 6 around and into the multifibers M. By taking up the shock, the intermediate glass tube 6 is deformed and fills in the voids at the outer edge of the array of multifibers M and forms an intimate uniform bond with the multifibers M to produce a resultant fused assembly as shown in FIG. 8. This facilitates obtaining a uniform electrical contact across the junction between the multifibers M and the outer ring 6. The outer ring 6 serves as a retaining ring to facilitate handling and mounting of the completed multichannel plate.

Figure 4:
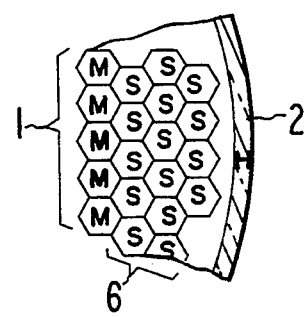

Referring now to FIG. 4 there is shown an alternative embodiment of the structure of FIG. 3 wherein the intermediate glass structure 6 is replaced by several layer of hexagonal solid fibers indicated by S in FIG. 4. The solid fibers S are made of a glass material as closely matched as possible to the cladding glass of the multiglass fibers 1. More particularly, the solid fibers S may conveniently be made of lead glass, such as lead glass G-12 may be Corning Glass Company having a softening point of approximately 630° C. or they may be made of Corning type 8161 glass having a softening point of 600° C. Due to the fact that the solid fibers S are closely packed and have the same size as the multifibers M, less distortion is required of the fibers S at the interface between the multifibers M and the solid fibers S which are to form the retaining ring structure 6 after fusion.

Figure 5:
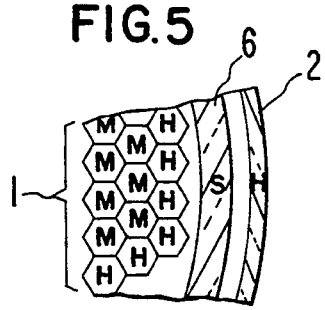

Referring now to FIG. 5 there is shown an alternative embodiment of the present invention wherein the intermediate glass structure 6 is essentially identical to that previously described with regard to FIG. 3 with the exception that one or more layers of solid hard fibers H are positioned about the outer periphery of the bundle of multifibers M. These solid fibers H preferably have a softening point above the softening point of the cladding glass employed in the multifibers M to assure uniform transmission of the compressive force exerted on the solid fibers H by the intermediate glass tube 6 as it is compressed inwardly on the multifibers 1. A suitable glass for these solid fibers H is silica glass type R-6 made by Kimball Glass Company having a softening temperature of approximately 695° C.

Figure 6:
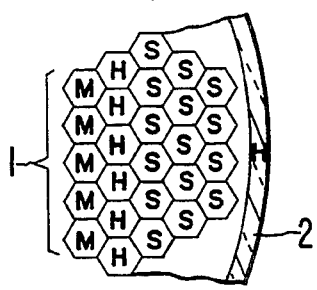

Referring now to FIG. 6 there is shown an alternative embodiment, similar to that of FIG. 4, with the exception that a single layer of relatively hard solid glass fibers H is provided at the interface between the multifibers M and several layers of relatively soft solid fibers S surrounding the hard fibers H. As in the embodiment of FIG. 5, the relatively hard solid fibers H serve to provide a structure for applying a uniform pressure to the multifibers M which does not have to rely upon distortion of the fibers H or structure S into the spaces between the adjacent multifibers M.

Figure 7:
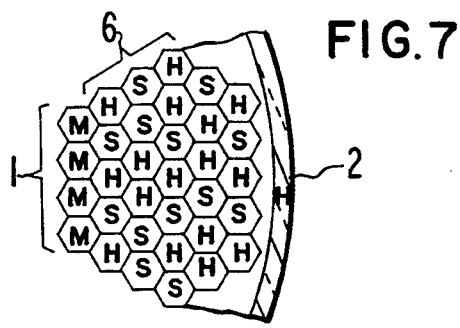

Referring now to FIG. 7 there is shown another alternative embodiment of the present invention. The structure of FIG. 7 is essentially similar to that of FIG. 6 with the exception that the hard and soft solid fibers H and S, respectively, are interspersed in a multiple layer of fibers 6 between the multifiber bundle M and the outer tube 2.

Thus, FIGS. 6 and 7 illustrate embodiments wherein the intermediate or second glass structure is formed with fibers H of a first group and fibers S of a second group, the fibers H of the first group having a softening temperature higher than the fibers S of the second group.

What is claimed is:

1. In a method for fabrication of a microchannel electron multiplier, the steps of:
assembling a bundle of glass multifibers, each of said multifibers consisting of a multitude of lesser glass fibers, each of said lesser glass fibers including a core portion of etchable glass surrounded by a sheath portion of more stable cladding glass, said sheath portions of said lesser glass fibers being fused together to form said multifiber;
positioning around said bundle an intermediate structure including glass having a softening temperature within −5% and +15% of the softening Celsius temperature of said cladding glass;
sealing the bundle of fibers and intermediate glass structure within an outer tube of glass having a softening temperature higher than said softening temperature of said intermediate structure;
evacuating the sealed assembly;
heating said seated assembly to a uniform temperature;
pressing inwardly uniformly on the sides of said heated assembly, said uniform temperature being such that under said pressing said outer tube collapses onto said intermediate structure, said intermediate structure transmits a compressive force upon said bundle, and said multifibers fuse together and to said intermediate structure.

2. The method of claim 1 wherein said intermediate structure includes a layer of solid glass fibers disposed abutting said bundle of multifibers.

3. The method of claim 1 wherein said intermediate structure includes a glass tube.

4. The method of claim 2 wherein said solid glass fibers have a softening temperature above the softening temperature of said cladding glass.

5. The method of claim 2 wherein said intermediate structure includes a plurality of layers of solid glass fibers surrounding said bundle of multifibers.

6. The method of claim 5 wherein said solid glass fibers comprise:
hard glass fibers having a softening Celsius temperature greater than 15% above the softening temperature of said cladding glass; and
soft glass fibers having a softening Celsius temperature between −15% and +15% of the softening temperature of said cladding glass.

7. The method of claim 6 wherein said hard glass fibers are interspersed with said soft glass fibers.

8. The method of claim 6 wherein said hard glass fibers are disposed to form a continuous layer abutting and surrounding said bundle of multifibers and said soft glass fibers arm disposed to form a layer surrounding said layer of hard glass fibers.

9. The method of claim 2 wherein said multifibers and said solid glass fibers are of generally equal hexagonal cross section, said multifibers and said solid fibers being closely packed.

10. The method of claim 3 wherein said glass tube of said intermediate structure has a wall thickness greater than that of said outer glass tube.

11. The method of claim 4 wherein said intermediate glass structure further includes a glass tube surrounding said fibers and wherein said glass tube has a wall thickness greater than that of said outer glass tube.

12. A microchannel plate comprising a fused glass structure produced by a process including the steps of claim 1.

13. In a second for fabrication of a microchannel electron multiplier, the steps of assembling a bundle of glass multifibers, each of said multifibers consisting of a multitude of less glass fibers, each of said lesser glass fibers including a core portion of etchable glass surrounded by a sheath portion of more stable cladding glass, said sheath portion of said lesser glass fibers being fused together to form said multifiber;
positioning around said bundle an intermediate structure of a first thickness including glass having a softening temperature within −5% and +15% of the softening celsius temperature of said cladding glass;
positioning an outer tube of a second thickness around said intermediate structure, the sum of said first and second thicknesses being substantially greater than the diameter of a multifiber;
sealing the said bundle of multifibers and intermediate glass structure within said outer tube of glass;
evacuating the sealed assembly;
heating said sealed assembly to a uniform temperature;
pressing inwardly uniformly on the sides of said heated assembly, said uniform temperature being such that under said pressing said outer tube collapses onto said intermediate structure, said intermediate structure transmits a compressive force upon said bundle, and said multifibers intimately fuse together and to said intermediate structure.

14. The method of claim 13 wherein said intermediate structure comprises solid glass fibers.

15. The method of claim 13 wherein said intermediate structure comprises a tube completely surrounding said bundle of multifibers.

16. A microchannel plate electron multiplier produced by a process including the steps of claim 13.

* * * * *

UNITED STATES PATENT AND TRADEMARK OFFICE
CERTIFICATE OF CORRECTION

PATENT NO. : 5,378,955
DATED : January 3, 1995
INVENTOR(S) : Russell F. Scott, Jr. et al.

It is certified that error appears in the above-identified patent and that said Letters Patent is hereby corrected as shown below:

Column 3, line 18: Change "Other" to -- Outer --.

Column 5, line 52, in Claim 1: Change "seated" to -- sealed --.

Column 6, line 10, in Claim 6: Change "-15" to -- -5 --.

Column 6, line 17, in Claim 8: Change "arm" to -- are --.

Column 6, line 33, in Claim 13: Change "second" to -- method --.

Column 6, line 36, in Claim 13: Change "less" to -- lesser --.

Signed and Sealed this

Fourteenth Day of March, 1995

Attest:

BRUCE LEHMAN

*Attesting Officer*     *Commissioner of Patents and Trademarks*